United States Patent [19]
Egigian

[11] Patent Number: 5,470,642
[45] Date of Patent: Nov. 28, 1995

[54] PAINT SAVER PAD

[76] Inventor: Donald S. Egigian, 2421 Almira Ave., Fullerton, Calif. 92631

[21] Appl. No.: 127,273

[22] Filed: Sep. 27, 1993

[51] Int. Cl.⁶ .................................................. B32B 9/00
[52] U.S. Cl. .................... 428/192; 428/52; 428/54; 428/56; 428/71; 428/99; 296/39.1; 293/1
[58] Field of Search ................ 428/31, 33, 52, 428/54, 56, 71, 316.6, 99; 296/39.2, 12.8, 39.1; 293/1

[56] References Cited

U.S. PATENT DOCUMENTS

| | | | |
|---|---|---|---|
| 4,572,568 | 2/1986 | Kapp et al. | 296/39 R |
| 4,789,574 | 12/1988 | Selvey | 428/31 |
| 4,838,427 | 6/1989 | Hurley | 206/586 |
| 4,839,629 | 6/1989 | Brown | 340/468 |
| 4,854,792 | 8/1989 | Cottone | 410/118 |
| 5,060,994 | 10/1991 | Martin et al. | 293/128 |

Primary Examiner—Patrick J. Ryan
Assistant Examiner—Abraham Bahta
Attorney, Agent, or Firm—G. Donald Weber, Jr.

[57] ABSTRACT

A paint saver pad comprised of a sheet or pad of resilient, waterproof material that can be easily installed in the cargo carrying area of a vehicle, typically a pickup truck, prior to the installation of a cargo carrying area protective bedliner in order to protect the vehicle surface from wear caused by the liner.

7 Claims, 1 Drawing Sheet

PAINT SAVER PAD

BACKGROUND

1. Field of the Invention

This invention is directed to a protective pad, in general, and to a pad installed between the surface of a vehicle and a protective bedliner therewith, in particular.

2. Prior Art

Up until 1978, vehicle owners wishing to transport cargo, especially pickup truck owners, were faced with the prospect that sooner or later the cargo carrying area of their vehicle would suffer significant wear and tear damage, especially paint deterioration. This damage and deterioration was largely due to the loading and unloading of cargo, as well as the shifting thereof relative to the truck bed. This problem of cargo area wear and tear and paint deterioration meant that constant maintenance was required, especially with regard to repainting and the incidence of rust and related damage.

Several versions of a protective liner for the cargo carrying area of a vehicle have been marketed with the goal of protecting these areas of the vehicle against wear and tear related to cargo carrying activities, especially damages due to shifting cargo and related stress and abrasive activity. These liners offered the ability to control the wear and tear on the cargo carrying areas of a vehicle, yet did not require substantial, permanent, expensive alterations. A liner could be installed with a minimum commitment of time and money and, if circumstances dictated, they could also be removed or replaced with similar commitments of time and money.

Following the introduction of protective cargo area bedliners, it soon became clear that while these liners represented substantial advances in controlling vehicle wear and tear, they were not, by themselves, a complete solution to the problem. That is, while these liners prevented many forms of damage to the vehicles in which they were installed, they also created certain problems of their own.

By design, these liners are placed directly upon the cargo carrying area or bed of the vehicle. These areas, like all other areas of the vehicle, are painted for aesthetic reasons as well as to avoid rust related problems and as such are subject to paint deterioration caused by the constant abrasive contact between the liner and these painted surfaces.

PRIOR ART STATEMENT

A patentability search, per se, was not conducted relative to this invention. Market surveys have not uncovered any similar product.

SUMMARY OF THE INSTANT INVENTION

The present invention comprises a protective pad or barrier which can be installed between the liner and the painted surface of the bed or cargo carrying area of a vehicle. The paint saver pad constituting the present invention utilizes a sheet of water resistant, non-abrasive material that is no more than ⅛" in thickness.

In order for the pad to be able to withstand the continual downward pressure exerted by the liner, it must be capable of absorbing downward abrasive pressure without suffering structural integrity failures, as well as side to side shifting. Materials such as cross-linked, closed cellular foam, as well as any other material exhibiting the physical characteristics herein described may be utilized.

Typically, the sheet (or paint saver pad) of the present invention is installed by cutting the sheet to size in order to accomodate the structural features of the vehicle cargo-carrying area. The cut sheet is then fixed into position by use of adhesive strips. In bedliners utilizing over-the-rail installation design, the instant invention is mounted to said rails by use of a spray-on adhesive. The procedure utilized will be dictated by the configuration of the cargo carrying area of the vehicle.

DESCRIPTION OF A PREFERRED EMBODIMENT

Figure 1:
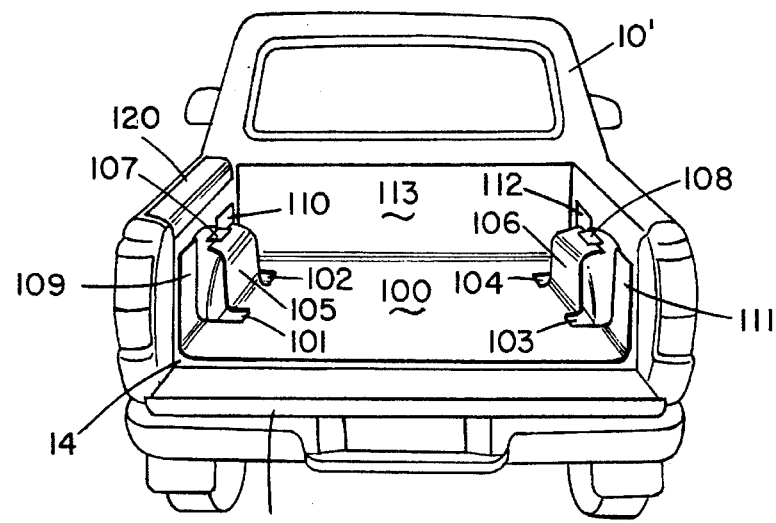
FIG. 1 is a perspective view of the paint saver pad installed in the cargo carrying area of a vehicle.
Figure 2:
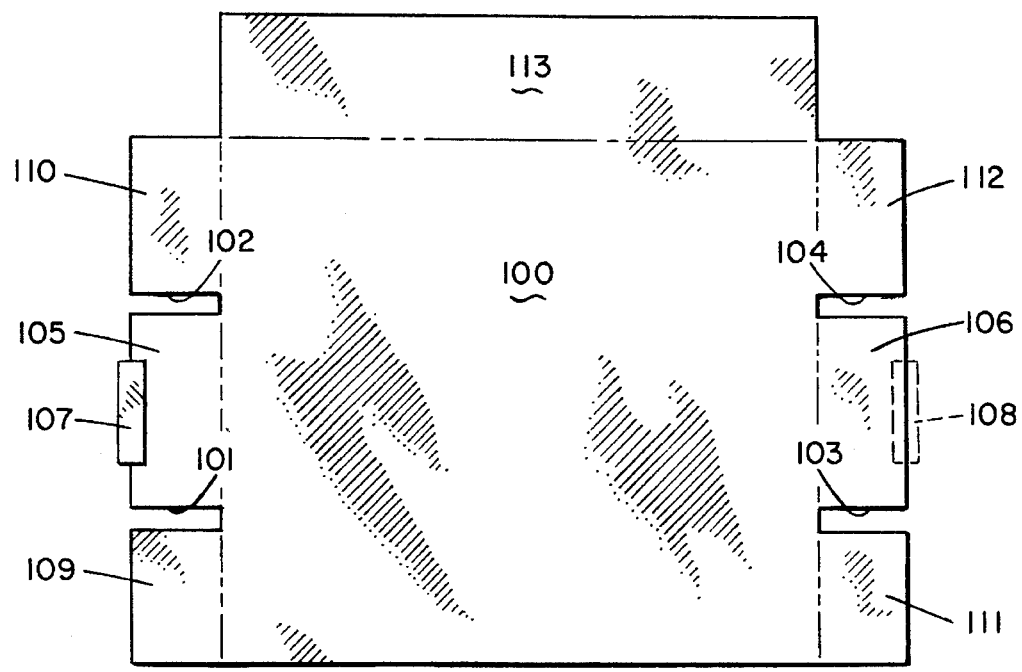
FIG. 2 is a plan view of one embodiment of the paint saver pad of the instant invention.

Referring now to FIGS. 1 and 2 concurrently, there is shown one embodiment of a paint saver pad 100 of this invention. FIG. 1 specifically depicts the pad 100 as applied to or installed in the cargo carrying area of a vehicle 10. In this illustration, vehicle 10 is a pickup truck or the like. However, other types of vehicles are contemplated.

Typically, the pad 100 is fabricated of a relatively thin, strong, water-repellant, closed cell foam material. The pad 100 is, typically, about ⅛" in thickness and non-abrasive. It has been determined that a pad of ⅛" or less in thickness can be utilized with all known commercially available liners without affecting the installation or effectiveness of the liner. The present invention is intended to be utilized in connection with protective liners for cargo carrying areas of vehicles and the following description will describe the invention and such application.

Typically, the pad 100 has a fixed width of 60 inches and is installed by placing said pad into the cargo carrying area of a pickup truck and making the appropriate cuts to conform to the wheel wells of said truck. Cuts 101 and 102 are made in one side of the pad 100 and cuts 103 and 104 are made in the other side of the pad 100. The cuts 101 and 102 form a tongue or flap 105 while the cuts 103 and 104 form a tongue or flap 106.

The respective flaps 105 and 106 are arranged to conform to the wheel wells at the interior walls of the vehicle 10.

In addition, suitable fasteners such as adhesive tape strips 107 and 108 are used to affix the ends of the flaps 105 and 106 to the upper portion of the respective wheelwells.

On either side of the flaps 105 and 106, the pad 100 lies on the floor 14 of the cargo bed and extends at least part way up the side wall of the cargo bed. These side wall extensions 109, 110, 111 and 112 assure that the bedliner does not rub against the floor and/or walls of the vehicle.

It has been determined that it is frequently unnecessary to apply a portion of the pad 100 between the bedliner and the rear cab wall 12. However, a segment 113 of the pad 100 can be so positioned if deemed desirable.

For similar reasons, a pad segment is not deemed necessary between the bedliner and the tailgate 11.

In a preferred embodiment, separate side wall pads 120 can be provided at the upper surface of the vehicle side rails.

It has been determined that the side wall pads 120 are best utilized by fastening to the undersurface of the bedliner (not shown). In particular, the side rail pads 120 are adhered to the bedliner surface by means of a suitable adhesive, for example, a spray adhesive. Of course, apertures can be provided in the side wall pads 120 to accomodate hold-down clamps, hooks or the like.

Deterioration of painted surfaces of the cargo carrying area due to the effect of abrasive contact between the bedliner and the painted surface can lead to abnormal wear and tear related damage to the vehicle. As a result of these concerns, a strong need has developed for a product that can prevent deterioration to painted surfaces when a liner is installed in the cargo carrying areas of a vehicle.

Figure 3:
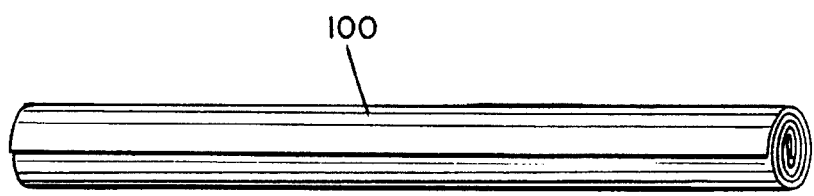
FIG. 3 is a perspective view of the paint saver pad in coiled configuration prior to being rolled out and cut to the desired dimension and configuration for installation in the cargo carrying area of a vehicle.

Referring now to FIG. 3, there is shown a pad 100 in coiled configuration prior to being unrolled to the desired dimension of the vehicle's cargo carrying area. The pad once uncoiled or laid out flat can then be configured to match the internal features and configuration of the vehicle's cargo carrying area by making the appropriate cuts or shaping where needed, as noted above. Once the pad is cut to the desired dimensions and configuration, it can be installed in the pickup truck's cargo carrying area by use of adhesive strips. If the bedliner utilizes a rail attachment procedure, the invention provides rail strips that mount to the bottom of the bedliner rail by means of a spray-on adhesive.

The cargo area liner (e.g. bedliner) is typically constructed of a strong, durable material such as plastic or metal so as to provide the necessary protection and strength. However, when the vehicle is in use, and particularly when it is in motion, the bedliner will often shift slightly side-to-side causing a downward grinding or abrasive force on the painted surface of the vehicle, in the absence of the paint saver pad.

In accordance with this invention, this cargo area liner is installed directly upon the paint saver pad 100 whereby the undersurface of the liner is cushioned and prevented from coming into contact with the painted surface of the cargo carrying area. Thus, the painted surface will be protected from the abrasive action or grinding. As a result, when the liner is removed or replaced, the painted surface of the cargo carrying area will not reflect the wear and tear it would otherwise experience if the area was not protected by the pad of this invention.

Thus, there is shown and described a unique design and concept of a paint saver pad. The particular configuration shown and described herein relates to a paint saver pad designed for use in the cargo carrying area of a vehicle. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. A protective device for use with a vehicle which is adapted to utilize a bedliner, comprising, a pad of resilient, hydrophobic, non-abrasive material, said pad configured to conform generally to the portion of the vehicle in which the bedliner is utilized, said pad is generally rectilinear in configuration, said pad includes at least one segment which extends outwardly therefrom, and adhesive strip adapted to retain said pad in position in said vehicle.

2. The device of claim 1 in which, said pad is made of a cross-linked closed cell plastic foam material.

3. The device of claim 1 wherein, said pad is about 1/8" in thickness.

4. The device of claim 1 wherein, said pad is capable of being installed under any vehicle cargo carrying area bedliner without interfering with the installation or functional efficiency of said bedliner.

5. The device recited in claim 1 wherein, said pad includes a plurality of segments extending from the perimeter thereof.

6. The device recited in claim 1 wherein, said pad is detached from said bedliner.

7. The device recited in claim 5 wherein, each segment can be selectively positioned at an angle to said pad.

\* \* \* \* \*